though 100 standard mesh screen and most of the particles

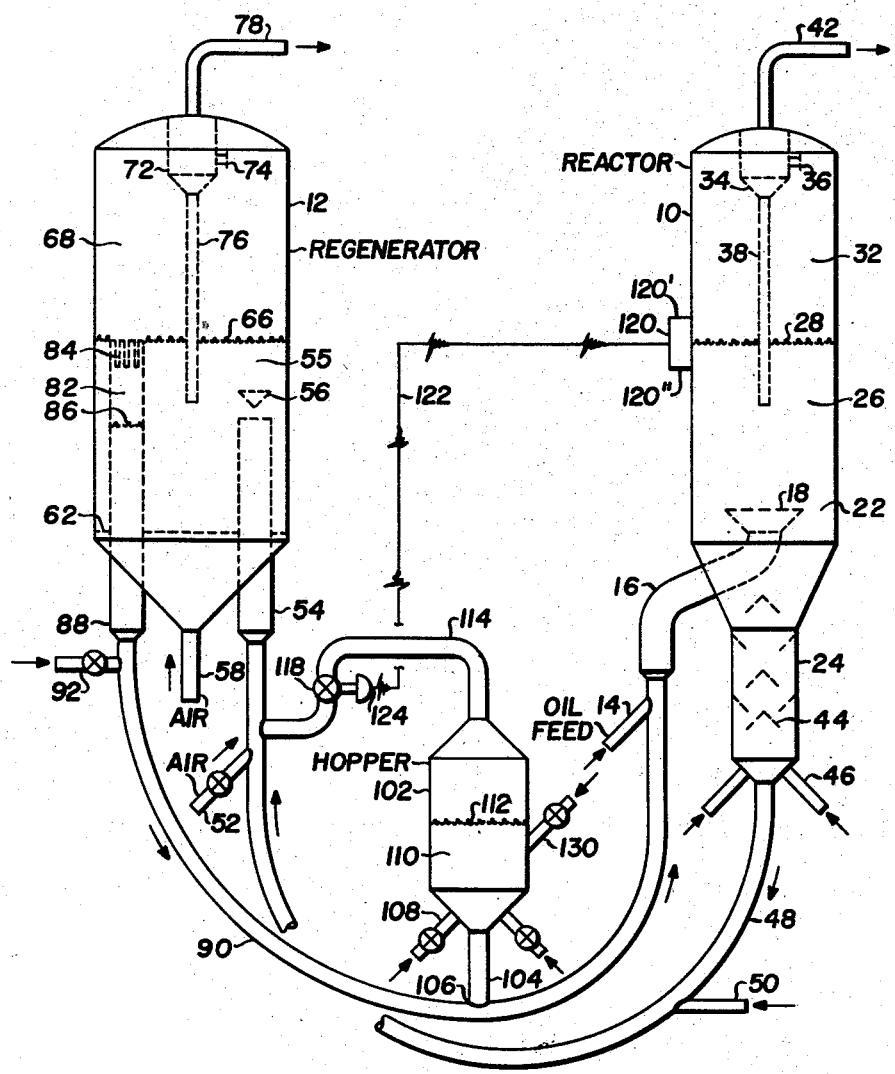

United States Patent Office 2,857,240
Patented Oct. 21, 1958

2,857,240

CONTACTING FINELY DIVIDED SOLIDS AND GASIFORM MATERIALS

Ross R. Quincy, Cranford, N. J., assignor to Esso Research and Engineering Company, a corporation of Delaware Application August 8, 1955, Serial No. 526,939

4 Claims. (Cl. 23—1)

This invention relates to contacting finely divided solids and gasiform material and more particularly relates to the catalytic conversion of hydrocarbons using finely divided catalyst.

In the most recent commercial fluid catalytic cracking units, the level of fluidized catalyst in the regeneration zone remains substantially constant because fluidized regenerated catalyst is withdrawn from the regeneration zone by means of an overflow standpipe. There is a certain amount of catalyst in the system and, with the level substantially fixed in the regeneration zone, there is no convenient way of changing the level of fluidized catalyst in the reactor in the event that it is desired to change the operating conditions or extent of conversion or if the feed stock quality should vary. The reactor catalyst holdup is controlled by the total unit catalyst inventory. Loss of catalyst from the unit can be compensated for by adding fresh make-up catalyst to the unit, but changes in the reactor holdup cannot be conveniently made to accommodate rapid changes in operating conditions and/or feed stock quality.

According to the present invention the conversion unit is changed to include an automatic reactor holdup controlling mechanism. A hopper for additional fluidized solids is provided and is connected at its bottom to the bottom of the transfer line or U-bend conducting regenerated catalyst from the regeneration zone to the reactor. The top of the hopper is connected by a line to the dense phase riser leading from the reactor to the regeneration zone and conveying spent catalyst to the regenerator. The top outlet line leading from the hopper is provided with a slide valve which is automatically controlled in response to the level of fluidized solids in the reactor. A level indicator is provided for the solids in the reactor and as this level varies for any reason the valve in the outlet line from the hopper will be varied in the size of its opening.

The extra amount or reserve supply of finely divided solids in the hopper is maintained in an aerated condition by the introduction of air thereinto and the slide valve is used to control the pressure at the top of the hopper. As the slide valve is closed or moved to cut down on the size of the valve opening, pressure will build up in the top of the hopper and fluidized solids will be forced out of the hopper into the transfer line leading to the reactor and this will increase the solids holdup in the reactor. On the other hand, if the slide valve is opened or moved to increase the size of the valve opening, pressure will decrease in the top of the hopper and fluidized solids will flow from the transfer line into the hopper bottom and reactor holdup will decrease. There is a certain pressure differential between the bottom of the hopper and the region where the top outlet line from the hopper is connected to the dense phase riser leading into the regenerator and this pressure differential will normally cause the fluidized solids to flow into the hopper and raise the level of fluidized solids therein. The slide valve will remain slightly open at all times to permit escape of aerating gas from the top of the hopper.

A level indicator and control is provided for indicating the level of fluidized solids in the reactor and this level indicator is electrically, pneumatically, or mechanically connected to the slide valve in the top outlet line from the hopper to effect the control above described.

While the invention is primarily intended for the catalytic cracking of hydrocarbon oils such as gas oil to gasoline, the invention may be used for other processes for circulating finely divided solids between two vessels, such as hydroforming naphthas, catalytic conversion of gasiform materials such as oxidation, reduction, desulfurization etc., provision being made for regenerating the solids or catalyst after the solids or catalyst become spent. The reactor may be generally used for contacting finely divided solids and any selected gasiform material.

In the drawing the figure represents one form of apparatus adapted to practice the invention, but the invention is not to be restricted thereto. The invention will be described specifically in connection with catalytic cracking of hydrocarbons as an example but the invention is useful with other processes.

Referring now to the drawing, the reference character 10 designates a cylindrical reaction vessel and the reference character 12 designates a regeneration zone. Oil to be cracked or converted is introduced through line 14 into line 16 leading into the lower portion of the reaction vessel 10. The outlet end of the line 16 is enlarged and is provided with a perforated distribution grid 18 for distributing the catalyst or finely divided solid particles and/or vapors or gasiform material in the reactor. The grid member 18 is circular and of a smaller diameter than the diameter of the vessel 10 so that there is a space 22 provided for permitting catalyst or finely divided solids to pass downwardly into the stripping section 24 which will be described hereinafter in greater detail.

The oil to be converted may be heavy or light gas oil or similar high boiling petroleum oils to be converted to lower boiling materials such as gasoline. The catalyst for the catalytic cracking reaction is preferably silica-alumina gel catalyst synthetically prepared but may be silica-alumina catalyst made by acid treating bentonitic clays or the catalyst may be silica-magnesia catalyst or other well known cracking catalysts. In the fluid process the catalyst is finely divided so that most of it passes through 100 standard mesh screen and the majority of the particles are between about 20 and 80 microns in size.

The oil vapors and any steam which may be introduced into line 16 pass upwardly through the reaction vessel 10 at a superficial velocity between about 0.5 and 5 feet per second to produce a dense turbulent liquid-simulating bed 26 having a level indicated at 28. Above the level 28 is a dilute phase 32 which contains much less catalyst than the dense fluidized bed 26. The reaction products in vapor form pass into a dust separating means, such as, one or more cyclone separators 34 through line 36 to separate entrained catalyst particles from the reaction vapors. The separated solid catalyst particles are returned to the dense bed 26 through dip leg 38 and the reaction vapors pass overhead through line 42 and are passed to any suitable separation equipment such as a fractionator to recover desired fractions. With silica-alumina catalyst the dense fluidized bed 26 will have a density between about 5 and 45 lbs. per cubic foot. In the cracking reactor 10 the temperature may be between about 850° and 1000° F. The w./hr./w. may be between about 2 and 10.

During the cracking reaction carbonaceous material is laid down on the catalyst and it is necessary to regenerate the catalyst to remove carbonaceous deposits. This partially spent catalyst is withdrawn from the dense bed 26 and is passed into the top of the stripper 24 provided with baffles 44 to increase the stripping action. Stripping gas such as steam is introduced into the bottom of the stripping section through one or more lines 46. The dense fluidized stripped catalyst is then passed through U-bend line 48 and introduced into the regenerator 12. The dense fluidized catalyst in the bottom portion of the U-bend is of substantially the same density from about the bottom of the stripping section 24 to the level of line 52 and, if desired, fluidizing gas may be introduced into the bottom portion of the U-bend through one or more lines 50. Air for the regeneration is introduced through line 52 into the upper riser portion 54 of the U-bend 48. Introduction of the air at this point reduces the density of the dense fluidized mixture and the less dense mixture is passed upwardly through line 54 into the dense bed of catalyst 55 in the regeneration zone 12. An inverted deflector conical member 56 is arranged above the top of the riser 54 to give improved distribution of the catalyst particles entering the dense fluidized bed 55.

Additional air is introduced through line 58 leading to the bottom of the regeneration zone 12 below distribution grid 62 which extends across the bottom portion of the regeneration zone or vessel 12. It will be noted that the upper end of the riser 54 extends above the distribution grid 62 for quite a distance and terminates at about the middle portion of the dense fluidized bed of catalyst 55. During regeneration the temperature may be between about 900° and 1150° F. The superficial velocity of the gas or air passing upwardly through the regeneration zone 12 is between about 0.5 and 5.0 feet per second and produces a dense turbulent fluidized bed 55 having a level indicated at 66 with a dilute phase 68 superimposed thereabove. The density of the fluidized bed 55 when using silica-alumina gel catalyst is between about 10 lbs. per cubic foot and 40 lbs. per cubic foot. The regeneration gases going overhead contain entrained solids and the solids are removed by passing them through a dust separating means such as one or more cyclone separators 72 through inlet 74. The separated solids are returned to the dense bed 55 through dip leg 76. The hot regeneration gases pass overhead through line 78 and are vented to the atmosphere.

Regenerated catalyst is withdrawn from the dense bed 55 through withdrawal well 82 which extends above the distribution grid 62 and above the upper end of the riser 54 to substantially determine the level 66 of the dense fluidized bed. The upper portion of the withdrawal well 82 is provided with vertical slots 84 to give a smoother rate of catalyst withdrawal and to permit slight variations in the level 66 of the dense fluidized bed without large fluctuations in the rate at which the catalyst overflows into the withdrawal well 82. The level of the catalyst being withdrawn by means of withdrawal well 82 will be below the upper end of the well 82 as indicated at 86. The well 82 forms the upper portion of standpipe 88 which in turn forms part of a second U-bend conduit 90 for conducting regenerated catalyst to the reactor 10. If desired, fluidizing gas may be introduced into the standpipe 88 through one or more lines 92 to maintain the catalyst particles in a dense fluidized condition. The bottom portion of the U-bend conduit 90 conveying the regenerated catalyst back to the reactor 10 and extending from the level of line 14 to a corresponding level in standpipe 88 comprises a seal of dense fluidized catalyst having a density between about 10 and 60 lbs. per cubic foot. This density is reduced in the line 16 when hydrocarbon oil is introduced through line 14 and the same is true of the riser 54 when air is introduced through line 52. However, the bottom portions of these U-bends, lines or conduits both act to seal the reactor from the regenerator so that there is no possibility of reverse flow in the U-bend lines or conduits. A more complete description of this type of apparatus is shown in the Packie Patent 2,589,124, granted March 11, 1952, and the disclosure is incorporated herein by reference to that patent.

As pointed out above, in the type cracking unit shown in the drawing the reactor catalyst holdup is controlled by the total catalyst inventory in the unit. The withdrawal well 82 determines the level of catalyst in the regenerator 12 and changes in the catalyst holdup in the reactor cannot be conveniently made to accommodate rapid changes in operating conditions or in feed stock quality or in any upsets which may occur. According to the present invention a hopper is provided which contains enough catalyst as a reservoir to provide for the normal fluctuations encountered. This hopper 102 has its bottom outlet line 104 connected into the bottom of the U-bend conduit 90 conducting regenerated catalyst from the regenerator to the reactor as shown at 106. The catalyst in the hopper 102 is maintained in a fluidized condition as a column or bed 110 by the addition of fluidizing gas through one or more lines 108. The catalyst column or bed 110 has a level indicated at 112.

Leading from the upper portion of the hopper 102 is a line 114 which communicates with the riser 54 conducting spent catalyst to the regenerator. Preferably this line 114 connects into the riser 54 above the point of introduction of air through line 52, since the pressure above line 52 is lower than below line 52. Line 114 is provided with a slide valve 118 which is controlled in any suitable manner in response to the level of dense bed catalyst 28 in the reactor 10. A level indicator and control 120 is provided adjacent the level 28 of the dense bed in the reactor 10 and it is possible with the present invention to maintain the level 28 substantially as desired between the limits of the operation 120' and 120" of the level indicator 120. The level indicator 120 can be any conventional indicator such as a Foxboro differential pressure indicator which will indicate the level 28 of catalyst above the lower instrument tap or limit 120". As the catalyst level 28 at indicator 120 goes down, the pressure differential between limits 120' and 120" will likewise go down and as the catalyst level 28 rises between limits 120' and 120" the pressure differential between these limits increases.

The level indicator 120 is connected electrically, pneumatically or mechanically as shown diagrammatically by line 122 to the control means 124 of the slide valve 118. The control means includes an actuating element, as for example, a motor for actuating valve 118.

In the operation of the invention, as the level 28 of the dense bed catalyst in reactor 10 falls below the control point, corresponding to level 28 on the level indicator 120, the valve 118 in hopper outlet line 114 will be actuated by control means 122 to partially close and in this way the pressure in the hopper will be increased and catalyst will be forced from the hopper 102 into the U-bend conduit 90 carrying regenerated catalyst through line 16 into the reactor 10. This will cause rising of the dense bed level 28 in the reactor and when the desired level is reached, the level control 120 will actuate the valve 118 to partially open and maintain the level 28 at the desired level. The valve 118 will be partially open at all times to permit escape of fluidizing gas from the hopper 102.

If for any reason the level 28 of the dense fluidized bed of catalyst in the reactor 10 rises above the control point, corresponding to level 28 on the level indicator controller 120 the valve 118 will be operated by the control means 122 and 124 to partially or further open the slide valve 118 and this will reduce the pressure on the top of the hopper and catalyst will flow from the dense fluidized catalyst mixture in the bottom of the U-bend conduit 90 conveying regenerating catalyst to the reactor 10 and will pass up through line 104 and raise the level of catalyst in the hopper 102 until the level 28 is lowered as desired.

The stripper shown in the drawing is one form of stripping section which may be used. In another form of a stripping section the grid 18 in reactor 10 may be provided with a cylindrical extension extending above the normal level 28 of the dense bed catalyst of the reactor 10 as shown in Patent No. 2,612,437 to Kaulakis et al. granted September 30, 1952. In this case the cylindrical extension is provided with orifices to permit passage of the spent catalyst from the reaction zone to the annular stripping section.

In a specific example for a unit of 13,000 barrels of fresh feed per day and a total catalyst inventory of about 150 tons, the catalyst holdup in the reactor 10 will normally be about 30 tons and the catalyst holdup in the regenerator 12 will be about 110 tons. The catalyst is silica-alumina catalyst containing about 13% alumina and is made up mostly of 20–80 microns size. The temperature in the reactor 10 is about 910° F. and in the regenerator 12 is about 1100° F. The catalyst to oil ratio is about 7 and the weight of oil per hour per weight of catalyst (w./hr./w.) is about 5. The density of the fluidized catalyst in the bed 28 in the reactor 10 is about 25 lbs. per cubic foot and the density of the fluidized bed 55 in the regenerator is about 30 lbs. per cubic foot.

The density of the dense fluidized catalyst in the bottoms of the U-bend lines, more specifically, in U-bend line 48 from the bottom of the stripping section 24 to the point of introduction of air at 52 is about 38 lbs. per cubic foot. The same is true of the other U-bend line 90 leading from the regenerator 12 to the reactor 10 and existing in the bottom portion of the U-bend to the point of oil feed at 14 so that this density is also about 38 lbs. per cubic foot. The downflow legs or standpipes or U-bends function as standpipes to build up pressure for circulating the catalyst between the two reaction vessels as is well known in the art.

For this specific example the amount of catalyst normally maintained in hopper 102 is about 10 tons and the catalyst in this hopper will be used to maintain the level 28 in the reactor at the desired level either by forcing catalyst into the reactor to raise the level or for withdrawing catalyst from the reactor 10 to reduce or lower the level if this is necessary for any reason. The pressure in the hopper 102 will normally be slightly above that in the riser 54 so that under normal conditions there is a slight leakage of air from the hopper 102 into the dense phase riser 54.

Line 130 is provided for supplying solids to hopper 102.

What is claimed is:

1. In a system wherein finely divided solids are circulated between two contacting zones through depending U-bend lines and a dense bed of solids is maintained in each of said zones and the level of one of said fluidized beds is maintained at a substantially constant level and the level of said other bed is subject to fluctuation, the improvement which comprises maintaining an extra supply of solids in a confined zone communicating with said U-bend line leading to said bed which is subject to fluctuation and increasing or decreasing the pressure in said confined zone to pass solids from said confined zone into said last-mentioned U-bend line or to pass solids from said last-mentioned U-bend line into said confined zone in response to variations in the level of said fluidized bed which is subject to fluctuation.

2. In a system wherein finely divided solids are circulated between two contacting zones through depending U-bend lines and a dense bed of solids is maintained in each of said zones and the level of one of said fluidized beds is maintained at a substantially constant level and the level of said other bed is subject to fluctuation, the improvement which comprises maintaining an extra supply of solids in a confined zone communicating with said U-bend line leading to said bed which is subject to fluctuation and changing the pressure in said confined zone to change the amount of solids therein and to move solids with respect to said confined zone to compensate for variations in the level of said fluidized bed which is subject to fluctuation.

3. In an apparatus for circulating finely divided solids between two contacting vessels adapted to contain fluidized beds of solids, means for circulating solids between said vessels, said means including U-shaped conduits interconnecting said vessels and having bottom loop portions extending a substantial distance below the bottom of said vessels, overflow means in one of said vessels for maintaining a substantially constant level of fluidized solids therein, level control means for the other of said vessels for maintaining the level of the fluidized bed of solids at a selected value therein, a hopper communicating at its bottom with the bottom loop of said U-shaped conduit which transfers solids to said last-mentioned vessel and communicating at its upper portion by means of a line with the riser portion of the other of said U-shaped conduits, said hopper adapted to contain a supply of solids, a valve in said last-mentioned line, said level control means being connected to said valve for actuating said valve in response to variations in the level of the fluidized solids in said last-mentioned vessel to change the pressure in said hopper for changing the amount of solids in said hopper and moving the solids with respect to said hopper to maintain the level of fluidized solids at the selected value in said last-mentioned vessel.

4. In an apparatus for circulating finely divided solids between two contacting vessels adapted to contain fluidized beds of solids, means for circulating solids between said vessels, said means including U-shaped conduits interconnecting said vessels and having bottom loop portions extending a substantial distance below the bottom of said vessels, overflow means in one of said vessels for maintaining a substantially constant level of fluidized solids therein, level control means for the other of said vessels for maintaining the level of the fluidized bed of solids at a selected value therein, a hopper communicating at its bottom with the bottom loop of said U-shaped conduit which transfers solids to said last-mentioned vessel and communicating at its upper portion by means of a line with the riser portion of the other of said U-shaped conduits, said hopper adapted to contain a supply of solids, pressure control means associated with said last-mentioned vessel, said level control means being connected with said pressure control means for actuating said pressure control means in response to variations in the level of the fluidized solids in said last-mentioned vessel to change the pressure in said hopper for moving the solids with respect to said hopper to maintain the level of fluidized solids at the selected value in said last-mentioned vessel.

References Cited in the file of this patent

UNITED STATES PATENTS

| | | |
|---|---|---|
| 2,412,025 | Zimmerman | Dec. 3, 1946 |
| 2,458,866 | Martin | Jan. 11, 1949 |
| 2,467,855 | Read | Apr. 19, 1949 |
| 2,514,282 | Holder | July 4, 1950 |
| 2,668,365 | Hogin | Feb. 9, 1954 |